Oct. 11, 1949.  E. B. SCHERL  2,484,123
LAMINATED BLOWPIPE HEAD
Filed Jan. 29, 1948  4 Sheets-Sheet 1
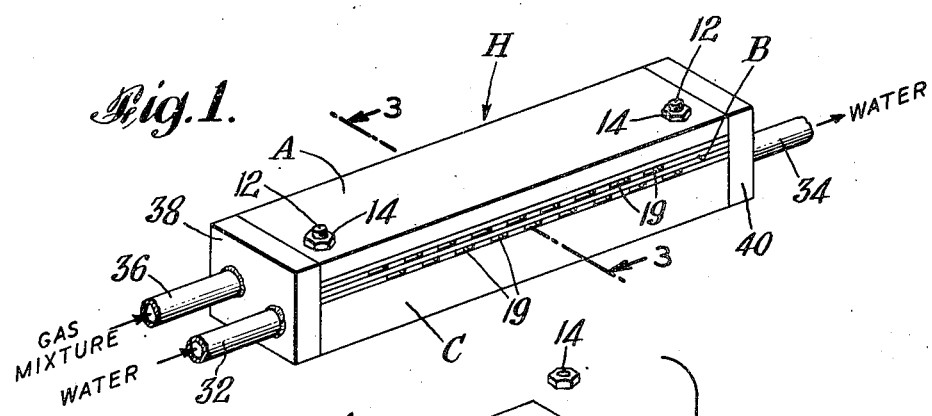
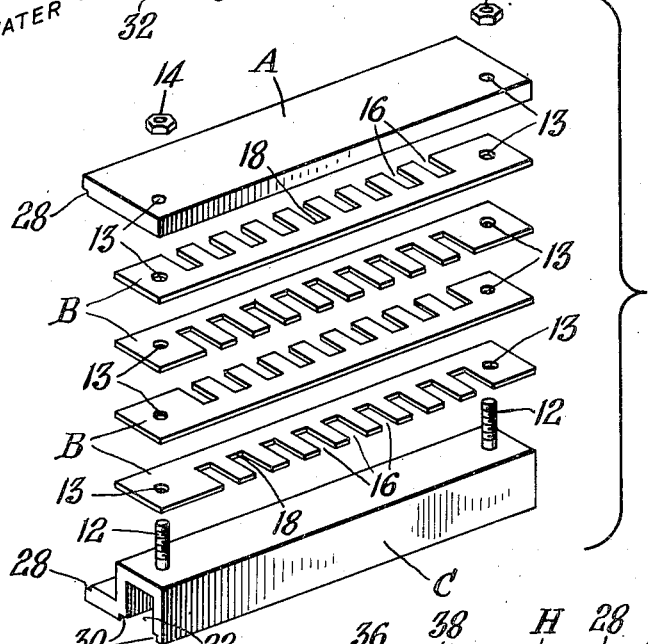
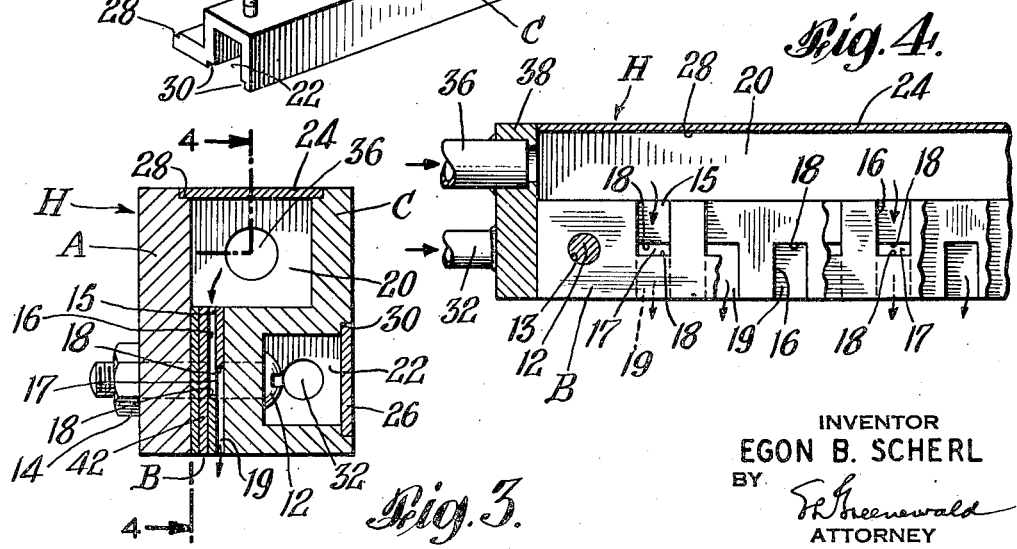
INVENTOR
EGON B. SCHERL
BY
*J. W. Greenewald*
ATTORNEY

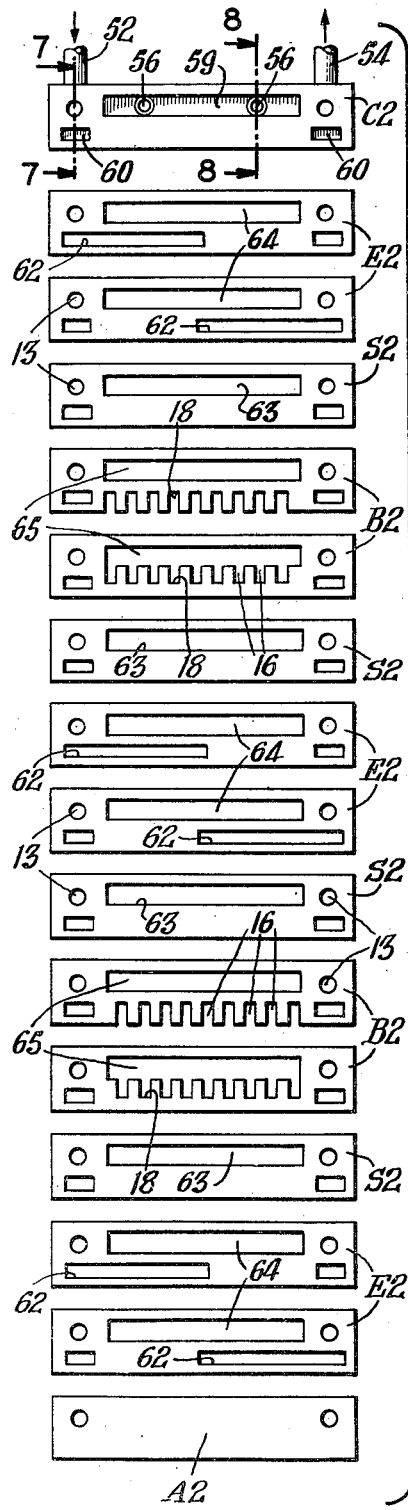

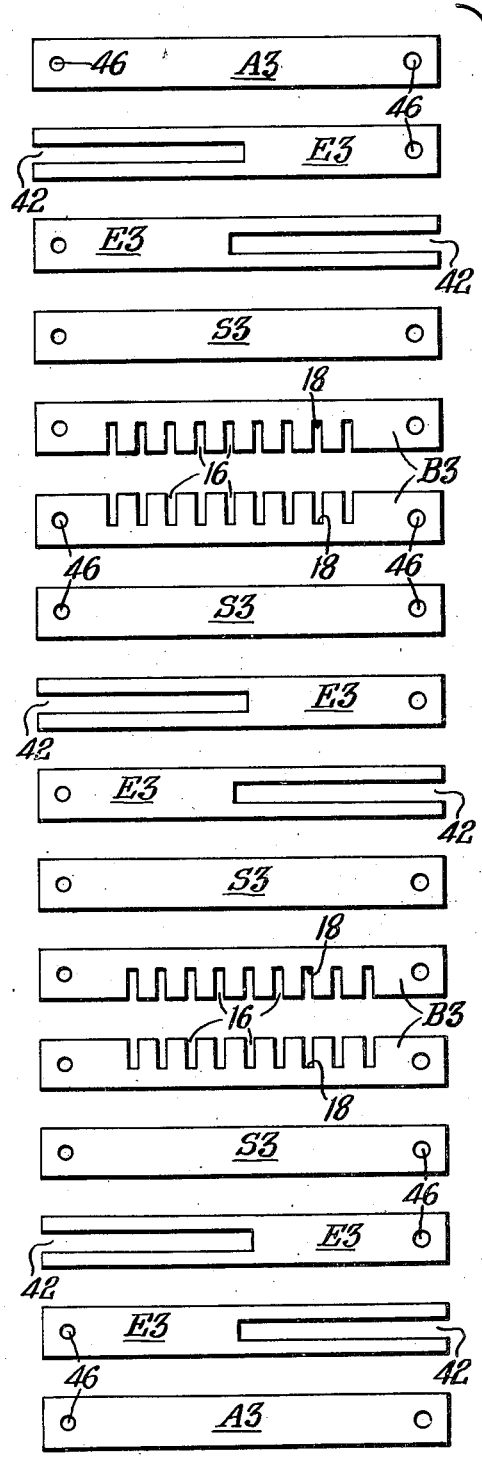
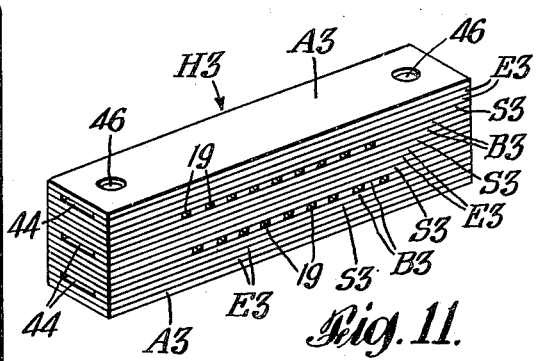
Fig. 11.
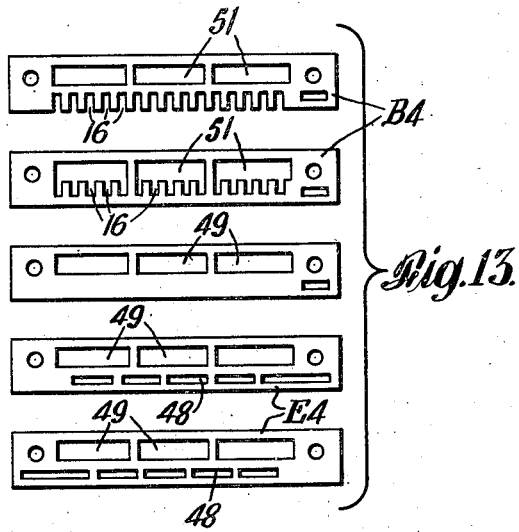
Fig. 13.
Fig. 12.
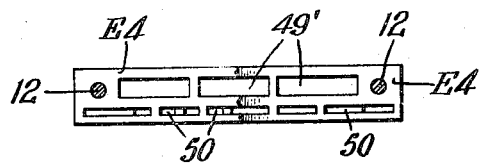
Fig. 14.
INVENTOR
EGON B. SCHERL
BY
ATTORNEY

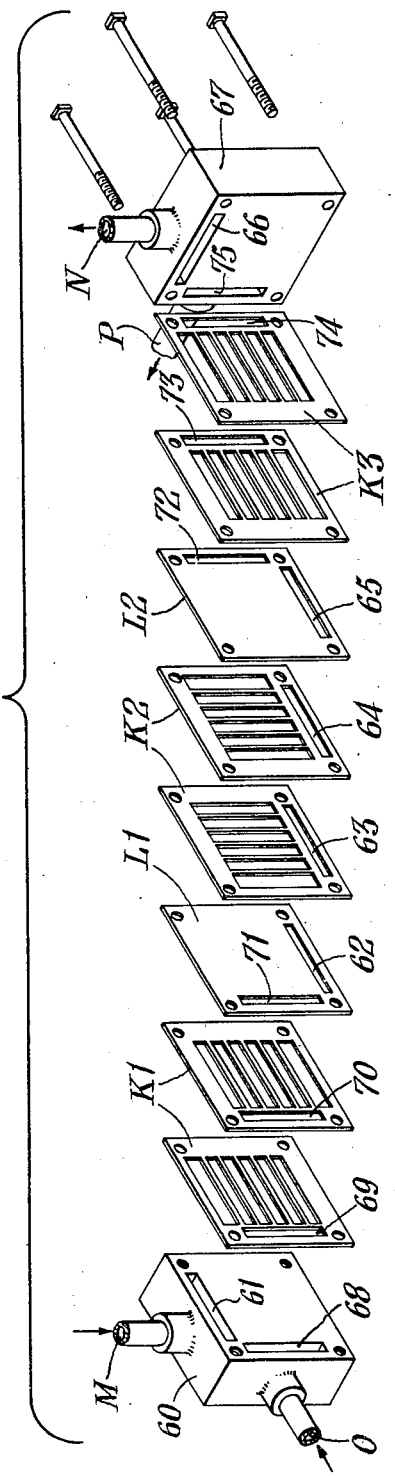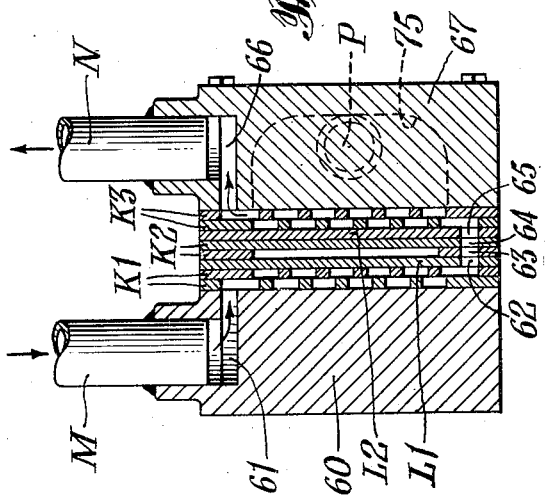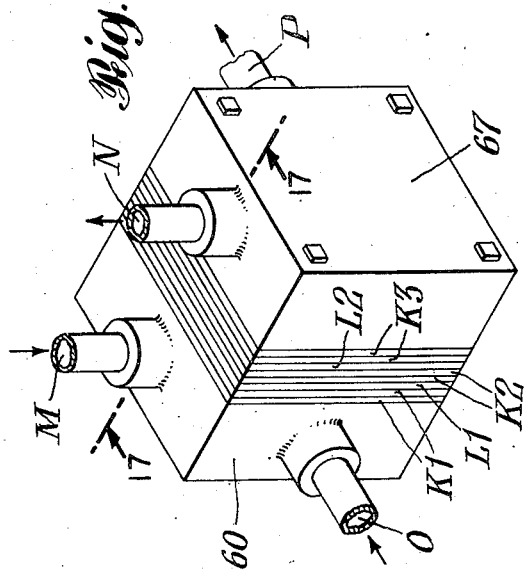

Patented Oct. 11, 1949

2,484,123

UNITED STATES PATENT OFFICE 2,484,123

LAMINATED BLOWPIPE HEAD

Egon B. Scherl, New York, N. Y., assignor to The Linde Air Products Company, a corporation of Ohio Application January 29, 1948, Serial No. 4,989

6 Claims. (Cl. 158—27.4)

1

This invention relates to laminated structures and more particularly to blowpipe heads and heat exchangers.

This application is in part a continuation of my application Serial No. 549,816, filed August 17, 1944, now abandoned.

Blowpipe heads of several types are available, each of which, although intended for some specific purpose, if its maximum efficiency is to be utilized, is, nevertheless, frequently useful in other fields. Thus, blowpipe heads are especially made for welding, cutting, scarfing, scale or paint removal, heat-treating, and the like. For maximum efficiency in many operations a continuous flame would be ideal. Since this has not heretofore been readily obtainable, makers of blowpipes have resorted to many expedients to obtain its equivalent, and their researches have resulted in the development of a large number of multi-tip or multiple-flame blowpipes, some of which are unique. Thus, in some cases blowpipe head or nozzle blocks have been provided with removable tips arranged in a single file or in multiple straight lines, or disposed over the block face in staggered relationship, or in other uniform or non-uniform arrangement. Other types have comprised blocks with drilled orifices for the passage of a combustible gas mixture, the passages, at their origin, opening into a gas chamber or conduit within the head, or communicating within the head by flexible or other means to the gas chamber or conduit.

In such multiple-flame nozzles one of the major difficulties lies in the maintenance of uniform delivery pressure of the gas to the outlet orifices. The problem of cooling is another major problem in multiple-flame nozzles, the seriousness of such problem increasing directly with the number of orifices. The additional space required for threading in the case of those nozzle blocks which are to accommodate tips results in a considerable loss in space efficiency. While such efficiency is obviously improved by the use of simple drilled orifices arranged in close proximity, there exist other difficulties associated with this latter block. For example, such orifices become enlarged in service due to burning or mechanical cleaning, neither of which conditions may be remedied by repair without altering the flame characteristic of the device.

2

In the blowpipe construction of the present invention, the difficulties above described are either minimized or eliminated. In a preferred form, the nozzle head or block or orifice bar is composed of a number of laminations or flat sections comprising metal strips or plates of special shapes which may be assembled in various ways as the particular occasion might demand. Essentially the invention is well adapted to provide a ribbon-type of flame suitable for pressure welding, for example, or a substantially unbroken area of flame for supplying a uniformly high rate of heat input for other uses such as torch hardening, scale or paint removal, and the like.

By the use of the laminations herein described, it is possible readily to fabricate, within reasonable limits, blowpipe heads or orifice bars or nozzle blocks of various sizes and forms, for example, of one or more flame levels.

The novel cooling system provided by the present invention furnishes a high heat exchange capacity with resulting minimization of back-fire and analogous objectionable phenomena. Furthermore, by only minor changes, the principles of the invention may be applied not only to blowpipes, but to other forms of heat exchange apparatus.

In the accompanying drawings there are illustrated typical embodiments of the invention, both the individual laminations and composite heads made up of a number of such laminations. In its preferred form the laminations and outer casing, to be described later, are composed of copper or other highly heat-conducting material.

Fig. 1 is a perspective view of a blowpipe head or orifice bar exemplifying the invention;

Fig. 2 is an exploded perspective view of parts of such bar;

Fig. 3 is an enlarged cross-sectional view taken on line 3—3 of Fig. 1;

Fig. 4 is an enlarged fragmentary view in longitudinal section taken on line 4—4 of Fig. 3;

Fig. 5 is a perspective view of a modification;

Fig. 6 is an exploded plan view of parts of such modification;

Fig. 7 is an enlarged cross-sectional view taken on line 7—7 of Fig. 6;

Fig. 8 is an enlarged cross-sectional view taken on line 8—8 of Fig. 6;

Fig. 9 is a view in longitudinal section of the modification, showing the fluid cooling system;

Fig. 10 is a similar view showing the gas distribution and discharge system;

Fig. 11 is a perspective view of another modification;

Fig. 12 is an exploded plan view of parts of the modification shown in Fig. 11;

Fig. 13 is an exploded plan view of parts of the orifice bar shown in Fig. 14;

Fig. 14 is a longitudinal view in section of a fourth modification;

Fig. 15 is an exploded view of a heat exchanger in accordance with the invention;

Fig. 16 is a perspective view of the heat exchanger of Fig. 15 after assembling; and Fig. 17 is an enlarged cross-sectional view taken on line 17—17 of Fig. 16.

In Figs. 1 through 4 there is illustrated an orifice bar or head H, dismantled in Fig. 2 to show individual parts. The members A, B, and C, are, respectively, a top plate, laminations, and a bottom member. In assembling, the laminations B and top plate A are stacked successively on the bottom member C, the latter being provided with screws 12 which extend through holes 13 in the former, in the manner indicated by the partially and the completed assemblages. Nuts 14 are finally placed on the screws 12 to hold the assembly together. The individual parts are provided, by tinning the mating surfaces, or otherwise, with means which seals the whole into an integral mass. Thus, after assembling, the bar H is subjected to heat-treatment at a temperature sufficiently high to melt the tin, solder, or thermosetting resin covering of the adjoining surfaces of the individual parts. Upon cooling the laminated structure is gas-tight.

The laminations B shown in Fig. 2 are typical of the invention. Each lamination is serrated at 16 to a depth greater than half the width of the individual lamination, the adjacent laminations having the serrated edges on opposite sides of the longitudinal axis, the channels 17 created by the mutually overlapping inner portions 18 of the serrations thus acting as connecting passages. Further, adjacent pairs of laminations are generally placed so as to have their serrations 16 staggered, so as to provide an essentially continuous or ribbon-type flame. The serrations in the resulting head form transverse passages each having an inlet portion 15, a connecting portion 18, and an outlet portion 19.

The manner of casing the assembled laminations B depends to a large extent upon the particular shape of the laminations and the size and form of the finished nozzle head, which in its turn depends upon the purpose which the head is expected to serve. For example, Figs. 1-4 illustrate a simple casing. The flanged channel form of member C provides, respectively, gas and coolant channels 20, 22 when two members 24, 26 which constitute cover plates for the gas and coolant conduits, are sealed in recessed sockets 28, 30 prepared to accommodate them. Provision also is made to connect the coolant and gas channels 20 and 22 to proper sources of supply through pipes 32, 34 and 36 and end closures 38 and 40. The laminations B are stacked between the casing members A and C at 42.

The coolant channel 20, although being sufficient to effect proper cooling in the case of a torch head comprising relatively few laminations B might be inefficient in the case of a head comprising many more laminations. In such cases, alternative forms described below might be used, in which the coolant flows through a plurality of passages within the laminations.

An alternative head H3 is illustrated, assembled and dismantled, in Figs. 11 and 12, respectively. This head is liquid cooled by water, for example. In addition to serrated laminations B3, there are included, alternately, blank laminations S3 for separating purposes, and additional pairs of adjacent laminations E3 provided with slots or cutouts 42 extending inwardly from the opposite ends thereof. Similarly to the serrations 16 above described, such cutouts 42 extend slightly beyond the transverse axis and mutually overlap to provide connecting channels 44 for the passage of water or other liquid coolant. The assembly of these serrated and cutout laminations is shown in Fig. 11. Any suitable casing may be provided for such laminated assembly, which is secured together by bolts (not shown) through aligned holes 46.

In the case of laminations of relatively great length where end cuts, as indicated, might weaken the structure, alternative forms, for example, as shown in Figs. 13 and 14, are preferable. In this case cutouts 48 rather than being continuous from the end of laminations E4 to a point beyond the center, are discontinuous or blind slots, the individual cutouts 48 in adjacent laminations E4 being staggered, and of a size such that end portions overlap. This provides passages 50 to accommodate the water or other coolant. Aligned slots 49 in the laminations E4 are aligned with corresponding slots 51 in laminations B4 which have opposed serrations 16 forming gas passages as described above, the aligned slots forming gas distribution channels 49' for such passages.

In Figs. 5–10 is illustrated a modification of the liquid-cooled head. Laminations E3 with deep end cutouts, as shown in Fig. 12, involve considerable production difficulty owing to the narrow side strips. The laminations in Figs. 5–10 represent, further, firmer patterns which can be punched with greater accuracy. In Figs. 5–10 the coolant may be thought of as flowing "in parallel" paths. Thus, it enters at 52, and following the arrow leaves through the same end member C2, at 54. The combustible gas mixture enters at 56, 56, and flows down through the longer slot 58 in the center of the laminations and burns at the openings or orifices 19 formed in each case by the toothed laminations B2.

As shown in Figs. 5–10, the head H2 includes the end or bottom member C2 which has a groove 59 therein and end passages 60 which communicate, respectively, with the gas inlets 56 and the water connections 52 and 54. Stacked on the member C2 are coolant-passage laminations E2, separator laminations S2, gas-passage laminations B2, and the end plate A2. Such parts are secured in assembled relation by the screws 12 and nuts 14, the screws extending through holes 13 in the laminations and end plate, as pointed out above. The coolant-passage laminations E2 have longitudinal slots 62 which overlap each other at their inner ends to provide a connecting passage 62'. The outer ends of the slots 62 overlap the coolant passages 60 in the end member C2. The separator laminations S2 have gas-distribution slots 63 which are aligned with corresponding slots 64 and 65 in the laminations E2 and B2 and with the groove 59 in the end member C2. The adjacent laminations B2 have opposed overlapping serrations 16 forming gas passages as described above.

Thus, when the parts are sealed together, the water inlet and outlet connections 52 and 54 are connected to a suitable source of water supply, and the gas inlet connections are connected to a source of mixed-gas supply, the mixed gas (such as oxygen and acetylene) flows into the gas-distribution passage 58 which distributes the gas uniformly to the inlet orifices 15 of the gas passages in the laminations B2, the gas then flowing through the connecting passages 17, and being discharged from the outlet orifices 19. Such orifices 19 are staggered, those in one row being offset with respect to those in the other row. At the same time, water flows through the longitudinal coolant passages or channels 50' formed by the slots 62 in the laminations E2. Since the coolant channels 50' are located between and above and below the rows of gas outlet orifices and near the flame face 66 of the head H2, very efficient cooling of the head is effected. Any number of rows of gas outlet orifices 19 may be provided, two being shown by way of example.

As mentioned before, the invention may also be used in heat exchanger systems or devices, since essentially separate paths are provided in a heat-conductive body for fluids having different temperatures. In Fig. 11, for example, fluids at different temperatures may be caused to flow through the channels 44 and 19; furthermore, the casing arrangement may be such that each of the respective channels 44 or 19 may be connected in independent series.

When the laminations are relatively large in area, it is of course preferable again to resort to the blind slot modification typified by the cutouts 48 in the laminations E4 of Fig. 13. The arrangement of the laminations in a heat exchanger of this type is shown schematically in Fig. 15. One fluid enters the end closure plate 60 at M, and after emerging from the recess 61 flows downwardly through the overlapping slots in laminations K1, passes through slots 62, 63, 64 and 65 in laminations L1, K2 and L2, flows upwardly through the overlapping slots in laminations K3, enters recess 66 in end closure plate 67 and is discharged at N. The second fluid enters the end closure plate 60 at O, and after emerging from the recess 68 passes through slots 69, 70 and 71 in laminations K1 and L1, then flows through the overlapping slots in laminations K2, after which it passes through slots 72, 73 and 74 in laminations L2 and K3, enters recess 75 in end closure plate 67 and is discharged at P. The contacting surfaces of the various parts constituting the assembly are preferably tinned or coated with a thermosetting resin to insure fluid-tightness when the assembly is bolted together and subjected to heat treatment, as already explained in connection with the blowpipe constructions. Fig. 16 illustrates the appearance of the assembled heat exchanger. Fig. 17 is a sectional view taken in the direction 17—17 of Fig. 16 and illustrates the passageway provided for the fluid that enters at M and is discharged at N. The separating laminations L1 and L2, which serve to conduct the heat from one fluid to the other, may be very thin since considerable support is conferred by the metal between the slots of the adjacent laminations. This together with the fact that each fluid stream must reverse its direction numerous times during its passage through the overlapping slots adjacent each separating lamination results in a highly efficient exchange of heat between the two fluids.

Although the foregoing description refers only to the illustrated heat exchanger comprising three pairs of slotted laminations, it will of course be understood that any desired number of pairs of slotted laminations may be employed.

Other combinations utilizing the basic principles of the invention will readily occur to those skilled in the art.

I claim:

1. A blowpipe head adapted to provide a ribbon-type of flame suitable, for example, for pressure welding, or a substantially unbroken area of flame for supplying a uniformly high rate of heat input for such applications as torch hardening; said head comprising a plurality of laminations composed of heat-conductive metal of appropriate size and thickness, having serrations of a depth greater than half the width of the laminations, adjacent laminations in a pair having the serrated edges on opposite sides of the longitudinal axes, and the adjacent pairs so placed as to have their serrations staggered, and in which channels are created by pairs of adjacently placed laminations with staggered cutouts, said pairs being interposed between the serrated laminations and separated therefrom by laminations without such cutouts, the channels created by the serrations and cutouts providing separate gas and liquid passages; and means uniting the individual laminations to make the whole structure gas-tight except for such passages.

2. A laminated structure comprising, in combination, a stack of metal laminations, a pair of adjacent laminations having serrated edges disposed in opposed relation with each other so that the serrations are in communication, forming fluid passages, another pair of adjacent laminations having longitudinal slots at least portions of which communicate with each other, forming conduits; means securing said laminations together in gas-tight relation, one fluid supply means connected to said fluid passages; and another fluid supply means connected to said conduits.

3. A laminated heat-exchanger comprising in combination, a stack of metal laminations formed to provide separate passages for different fluids, a pair of such laminations having internally communicating opposed slots, and a pair of such laminations having internally communicating opposed serrations; and means securing the laminations together in fluid-tight relation, so that different fluids may be contained in such separate passages without any cross-leakage.

4. In combination, a laminated metal body having at least one passageway extending therethrough, said body including edge serrated flat laminations which are provided with offset fluid inlet and outlet openings connected by cross passages formed by mutually overlapping portions of such openings, and means connecting said laminations together in gas-tight relation.

5. A laminated structure comprising in combination, a stack of metal laminations including paired laminations having interconnecting slots providing passage for fluid flow in one direction and, in abutting face-to-face relation with at least one of the laminations in said stack, at least one metal member provided with separate passage means for fluid flow in a direction perpendicular to said first direction.

6. A heat exchanger comprising a stack of metal laminations including, in consecutive order, a pair of laminations having interconnecting slots providing passage for a first fluid in one direction, and by-pass slots for a second fluid; a separating lamination provided with by-pass slots for both fluids; and another pair of laminations having interconnecting slots providing passage for said second fluid perpendicular to said direction, and by-pass slots for said first fluid; all the laminations constituting said stack being secured in fluid-tight relation to prevent admixture of the first and second fluids.

EGON B. SCHERL.

REFERENCES CITED

The following references are of record in the file of this patent:

UNITED STATES PATENTS

| Number | Name | Date |
|---|---|---|
| 794,225 | Humphrey | July 11, 1905 |
| 908,776 | Kittle | Jan. 5, 1909 |
| 1,568,771 | Roy | Jan. 5, 1926 |
| 1,742,607 | Machlet et al. | Jan. 7, 1930 |
| 2,199,951 | Gorman | May 7, 1940 |

FOREIGN PATENTS

| Number | Country | Date |
|---|---|---|
| 23,291 | France | May 21, 1921 |